US011564237B2

(12) United States Patent
Chen et al.

(10) Patent No.: US 11,564,237 B2
(45) Date of Patent: Jan. 24, 2023

(54) METHODS AND DEVICES FOR CONFIGURATION OF INTERFERENCE MEASUREMENT PARAMETERS

(71) Applicant: ZTE Corporation, Guangdong (CN)

(72) Inventors: Yijian Chen, Guangdong (CN); Zhaohua Lu, Guangdong (CN); Yu Ngok Li, Guangdong (CN); Hao Wu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/876,049

(22) Filed: May 16, 2020

(65) Prior Publication Data
US 2020/0314865 A1 Oct. 1, 2020

Related U.S. Application Data

(63) Continuation of application No. PCT/CN2017/111733, filed on Nov. 17, 2017.

(51) Int. Cl.
H04W 72/08 (2009.01)
H04L 5/00 (2006.01)
(Continued)

(52) U.S. Cl.
CPC ......... H04W 72/082 (2013.01); H04L 5/0057 (2013.01); H04W 72/005 (2013.01); H04W 72/044 (2013.01)

(58) Field of Classification Search
CPC ............ H04W 72/082; H04W 72/005; H04W 72/044; H04W 16/14; H04W 28/16; H04W 72/00; H04L 5/0057
See application file for complete search history.

(56) References Cited

U.S. PATENT DOCUMENTS

2013/0250788 A1* 9/2013 Kim ..................... H04J 11/0023
370/252
2013/0273923 A1* 10/2013 Li ........................ H04W 28/02
455/450
(Continued)

FOREIGN PATENT DOCUMENTS

CN 104519515 A 4/2015
CN 104662813 A 5/2015
(Continued)

OTHER PUBLICATIONS

Office Action for Japanese Patent Application No. 2020-526983, dated Aug. 10, 2021, with English summary (7 pages).
(Continued)

Primary Examiner — Ian N Moore
Assistant Examiner — Latresa A McCallum
(74) Attorney, Agent, or Firm — Perkins Coie LLP

(57) ABSTRACT

An exemplary embodiment describes a wireless communication method to selectively operate, based on an inconsistency condition, a transmitting end in one of a first mode and a second mode. When inconsistency is absent, the transmitting end can transmit in the first mode in which the transmitting end schedules transmission resources for interference assessment on a same time unit as data or control transmissions. Upon detection of inconsistency, the transmitting end can transmit in the second mode in which the transmission resources for determining interference are scheduled to occupy different time units than data or control transmissions.

18 Claims, 8 Drawing Sheets

Selectively operating, based on an inconsistency condition, a transmitting end in one of a first mode and a second mode — 402

Upon detecting that inconsistency is absent, the transmitting end transmits in the first mode in which the transmitting end schedules transmission resources for interference assessment on a same time slot as data or control transmissions — 404

Upon detection of inconsistency, the transmitting end transmits in the second mode in which the transmission resources for determining interference are scheduled to occupy different time slots than data or control transmissions — 406

(51) Int. Cl.
*H04W 72/00* (2009.01)
*H04W 72/04* (2009.01)

(56) References Cited

U.S. PATENT DOCUMENTS

| | | | |
|---|---|---|---|
| 2013/0287009 A1* | 10/2013 | Ahn | H04W 16/14 370/336 |
| 2013/0301450 A1 | 11/2013 | Geirhofer et al. | |
| 2014/0086082 A1 | 3/2014 | Kim et al. | |
| 2015/0111505 A1 | 4/2015 | Kim et al. | |
| 2016/0029417 A1* | 1/2016 | Vannithamby | H04W 76/14 455/422.1 |
| 2017/0142753 A1* | 5/2017 | Wang | H04W 16/14 |
| 2018/0310318 A1* | 10/2018 | Kim | H04B 17/318 |

FOREIGN PATENT DOCUMENTS

| | | |
|---|---|---|
| CN | 104904271 A | 9/2015 |
| CN | 106538016 A | 3/2017 |

OTHER PUBLICATIONS

International Search Report and Written Opinion dated Jul. 27, 2018 for International Application No. PCT/CN2017/111733, filed on Nov. 17, 2017 (6 pages).
ZTE et al., "Discussion on interference measurement for MU-CSI", 3GPP TSG RAN WG1 Meeting #86bis, Lisbon, Portugal, R1-1608683, Oct. 2016.
Qualcomm Inc., "On Interference Measurement Resource", 3GPP TSG RAN WG1 #88bis, Spokane, Washington, R1-1705585, Apr. 2017.
ZTE et al., "Multi-TRP Transmission/Reception for DL and UL", 3GPP TSG RAN WG1 Meeting NR#3, Nagoya, Japan, R1-1715435, Sep. 2017.
Extended European Search Report for European Patent Application No. 17932142.7, dated Jul. 22, 2020.
Office Action for Korean Patent Application No. 10-2020-7017129, dated Dec. 7, 2021, with English summary (8 pages).
NTT Docomo, Inc., "Work plan for Rel-15 NR WI", 3GPP TSG RAN WG1 Meeting #90bis, Prague, CZ, R1-1718177, Oct. 2017.
Communication pursuant to Article 94(3) for European Patent Application No. 17932142.7, dated Feb. 24, 2022.
Office Action for Chinese Patent Application No. 201780096967.6, dated Nov. 16, 2022 (8 pages).

* cited by examiner

METHODS AND DEVICES FOR CONFIGURATION OF INTERFERENCE MEASUREMENT PARAMETERS

CROSS REFERENCE TO RELATED APPLICATIONS

This patent document is a continuation of and claims benefit of priority to International Patent Application No. PCT/CN2017/111733, filed on Nov. 17, 2017. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This disclosure relates to methods, systems, and devices for mitigating collision of the reception beam in an interference measurement for multiple input multiple output (MIMO) technology. With the development of MIMO technology for Long Term Evolution (LTE), the sending end and the receiving end in a wireless communication system generally includes multiple antennas to send and receive information at a higher rate. One benefit of MIMO technology is that it enables the sending end and the receiving end to have beamforming capability and it can align the beam to a certain direction to receive information. With beamforming technology, an accurate interference measurement enables the sending end and the receiving end to fully realize system performance. In existing interference measurement technologies, there may be other channels or signals on the Orthogonal Frequency Division Multiplexed (OFDM) symbol where the IMR is located, which may cause collision of the reception beams.

An exemplary embodiment discloses a wireless communication method. The exemplary method comprises selectively operating, based on an inconsistency condition, a transmitting end in one of a first mode and a second mode. Upon detection of an absence of inconsistency, the transmitting end transmits in the first mode in which the transmitting end schedules transmission resources for interference assessment on a same time unit as data or control transmissions. Upon detection of inconsistency, the transmitting end transmits in the second mode in which the transmission resources for determining interference are scheduled to occupy different time units than data or control transmissions.

In some embodiments, the transmission resources for interference assessment include interference measurement resource (IMR). In some embodiments, the data or control transmissions include transmissions of Physical Downlink Shared Channel (PDSCH), Physical Downlink Control Channel (PDCCH), or Demodulation Reference Signal (DMRS).

In some embodiments, the transmission resources for interference assessment are determined by a receiving manner of Channel State Information-Reference Signal (CSI-RS). In an embodiment, a configuration of the data or control transmissions indicates a transmit beam for transmission. In some embodiments, the interference assessment and data or control transmissions are frequency division multiplexed.

Another exemplary embodiment discloses a wireless communication method that comprises determining a receiving beam for the interference assessment by operating a wireless device in one of a first mode and a second mode. The receiving beam used in the first mode is determined to be same as a beam used for data or control transmissions, and the receiving beam used in the second mode is determined based on a pre-configuration between a receiving end and a transmitting end.

In some embodiments, the wireless device is operated in the first mode by frequency division multiplexing transmission resources for interference assessment with data or control transmissions. In an embodiment, the data or control transmissions comprises Physical Downlink Shared Channel (PDSCH), Physical Downlink Control Channel (PDCCH), Physical Broadcast Channel (PBCH) or Reference Signal (RS). In an exemplary embodiment, the reference signal (RS) includes total radiated sensitivity (TRS), CSI-RS, or synchronization signal (SS).

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
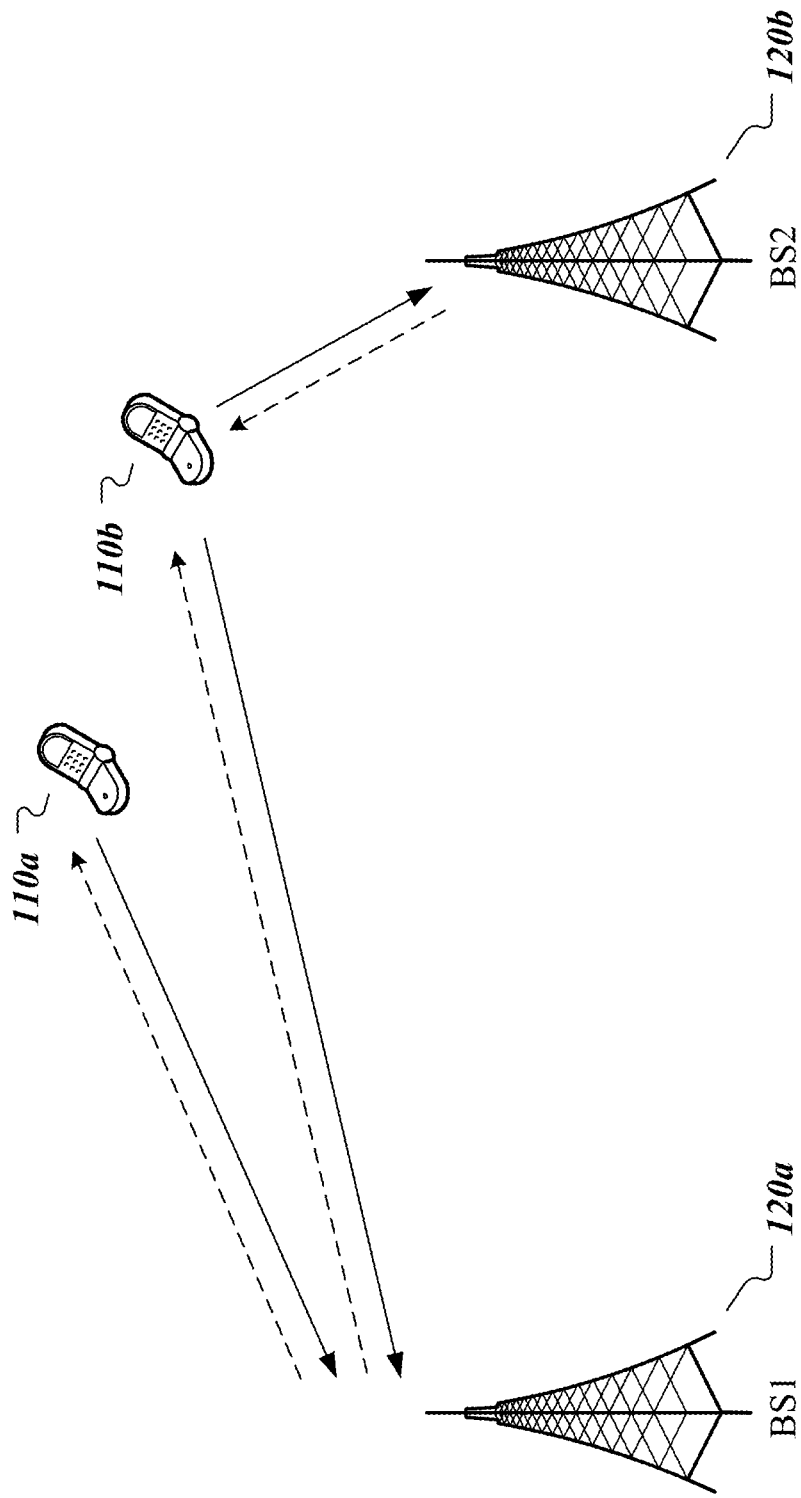
FIG. 1 shows exemplary mobile stations and base stations operating in a beamforming wireless environment.

The performance of Channel State Information (CSI) measurement is a precondition for efficient MIMO transmission. Accurate channel information can fully make use of the transmission capacity. For instance, inaccurate channel information may lead to low transmission efficiency. For larger number of antennas, the requirement of the accuracy of channel information can be higher. Generally, CSI information includes Channel Quality Indicator (CQI) and Rank Indicator (RI) information, and may also include Precoding Matrix Indicator (PMI) and Channel Statement Information Reference Signal (CSI-RS) Resource Indicator (CRI) according to various circumstances. In MIMO, the default approach for CSI measurement generally yields a recommended CQI with the following assumptions:

(1) The base station uses the recommended RI as the number of layers for spatial multiplexing to transmit RI data, and simultaneously uses the layer mapping method specified in the protocol.
(2) The signal is pre-coded with the recommended PMI.
(3) Interference and noise are measured by the User Equipment (UE) or terminal.

According to (1), (2) and (3) and a reception algorithm actually used by the terminal, the CQI, RI, PMI, CQI, or CRI is calculated based on Signal to Interference plus Noise Ratio (SINR) obtained by the processing of the reception algorithm. The accuracy of calculation and selection is affected by two aspects: channel measurement and interference noise measurement.

Therefore, whether the CQI is measured at the terminal side or the CQI is calculated by the base station, the terminal measures the interference so that the channel quality can be accurately reflected and the transmission can be efficiently performed. Thus, as mentioned earlier, accurate interference measurement can ensure that the system performance can be fully realized. Conversely, incorrect inference information may lead to communication inefficiencies. For example, wrong interference information may cause the number of layers to be mismatched with the actual channel quality. In another example, an incorrect measurement of interference noise information may lead to a situation where a channel that actually supports only two layers is misjudged to support four layers, which may result in a high bit error rate. In another example, a channel that can support only low-order coding and modulation schemes may be misjudged to support high-order coding and modulation schemes, which can lead to an excessive bit error rate. On the other hand, transmission resources may be poorly utilized if a channel can support multi-level and high-order coding and modulation schemes but only uses a few layers and low-level coding for transmission.

Since the IMR is configurable, and since signals for the IMR are generally not sent by the local cell, the receiving end can detect all interference signal received from other cells. Different IMR locations may correspond to different interference points. Compared with the aforementioned reference signal based interference measurement method, this method has the advantage of being able to flexibly assign interference measurement resources, measure the characteristics of interference signals expected to be obtained, and obtain an accurate inference measurement since the measured signals are interference signals. Therefore, this method of using IMR is used in the later versions of LTE's 4G and 5G.

Currently, a typical wireless communication setup includes a receiving end with fewer antennas than the sending end, and the directions of the receiving antennas can be omni-directional. Therefore, the receiving method is typically fixed, and the measured interference can be less affected by the receiving manner. From the perspective of the channel, the signal arrives at the receiving end from multiple paths, and if the receiving end adopts an omni-directional wide beam reception manner, the receiving end receives the interference from all directions.

With the development of MIMO technology, the sending end and the receiving end in a wireless communication system generally includes multiple antennas to send and receive information at a higher rate. One benefit of MIMO technology is that it enables the sending end and the receiving end to have beamforming capability and it can align the beam to a certain direction to receive information. With beamforming technology, an accurate interference measurement enables the sending end and the receiving end to fully realize system performance. In existing interference measurement technologies, there may be other channels or signals on the Orthogonal Frequency Division Multiplexed (OFDM) symbol where the IMR is located, which may cause collision of the reception beams.

One problem with current interference measurement technology is that when reception beams collide, the base station does not accurately know how the terminal performs interference measurement. As a result, the base station does not know the direction from which the reported channel quality information or interference information is received.

FIG. 1 shows exemplary mobile stations and base stations operating in a beamforming wireless environment. The base station BS1 (120*a*) and base station BS2 (120*b*) are in communication with the mobile stations (110*a*) and (110*b*). To further illustrate the problem discussed above, a base station BS1 (120*a*) may not know how a mobile station (110*a*) perform interference measurement if a reception beam with an OFDM symbol at a certain time unit and sub carrier for mobile station (110*b*) interferences with another beam with an IMR located on the same time unit and sub carrier for mobile station (110*a*). In some embodiments, each time unit may represent the transmission time of one OFDM symbol.

Figure 2:
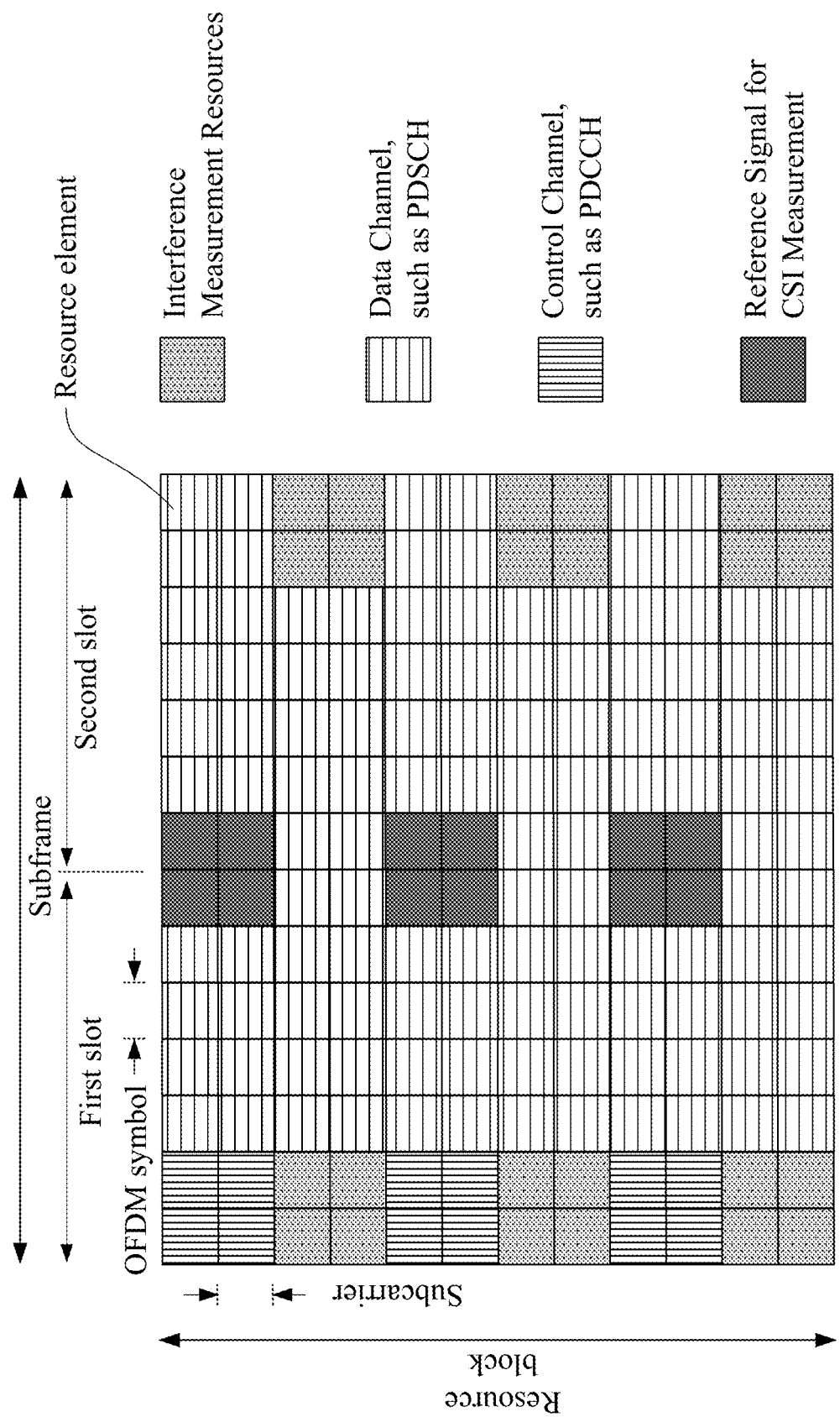
FIG. 2 shows an exemplary mapping of the relationship between IMR resource and other information transmitted and received on a LTE subframe.

FIG. 2 shows an exemplary mapping of the relationship between IMR resource and other information transmitted and received on a LTE subframe. The subcarriers are shown along the vertical axis and the various ODFM symbols are shown along the horizontal axis. FIG. 2 shows that the first frame includes a first ODFM symbol location and a second ODFM symbol location where control channel, such as Physical Downlink Control Channel (PDCCH) and IMR may conflict. FIG. 2 also shows that the second frame includes a sixth ODFM symbol location and a seventh ODFM symbol location where data channel, such as Physical Downlink Shared Channel (PDSCH) and IMR are in conflict. When transmissions are performed and some resource elements are allocated to the IMR, the base station may not transmit any information on the REs allocated to the IMR. This allows the receiver or the UE to measure interference caused by other base stations or other UEs. However, in some situations where the receiving beams of IMR and data or control information may be in conflict, which results in inconsistent understanding of the reception beams of the interference measurement of the base station and the terminal. In some embodiments, the transmitting end can receive information from the sending end related to inconsistency. For example, a transmitting end, such as a base station, can determine that an inconsistency exists if the base station cannot accurately determine the Modulation and Coding Schemes (MCS). The base station can receive downlink quality information from Channel Quality Indicator (CQI) sent by UE. CQI can be based on Signal to Interference-plus-Noise Ratio (SINR) at the UE. The base station can determine MCS using the CQI information so that the SINR that does not exceed a certain frame error rate. In one example, a base station may not be able to accurately determine an MCS if the SINR is low or below a certain threshold or if the receiver cannot have two receiving beams in the same time unit—one to perform interference measurement and another to receive control or data information.

Figure 3:
FIG. 3 shows an exemplary flowchart to determine transmission strategy of data or control information based on reception beam collision.

FIG. 3 shows an exemplary flowchart to determine transmission strategy of data or control information based on reception beam collision or an inconsistency condition. At 302, the sending end configures the IMR to the receiving end. Each IMR consist of a group of Resource Elements (REs), which can be configured by the base station through Radio Resource Control (RRC), MAC and/or Downlink Control Information (DCI) signaling. An IMR can be used for one or more measurement process.

At 304, the receiving end and the sending end can stipulate to or the sending end can configure the receiving manner of the IMR. Receiving manner can include a receiving antenna, a receiving beam, a receiving port, a receiving panel, a receiving virtual cell, and so on. In some embodiments, the BS can specify the receiving manner of IMR or a reference object for determining the receiving manner of IMR to UE. In some other embodiments, the BS and UE can stipulate that the receiving manner of the IMR can be determined by the receiving manner of the CSI-RS in the same measurement process. For example, the sending and receiving end can stipulate that the CSI-RS associated with the IMR uses the same reception manner. CSI-RS associated with the IMR can be a reference object configured for determining receiving manner of IMR.

At 306, the receiving end and the sending end can stipulate to or the sending end can configure the quasi-co-location (QCL) information of the data or control information such as PDSCH, PDCCH, Physical Broadcast Channel (PBCH), or Demodulation Reference Signal (DMRS). The QCL configuration can be used for indicating a transmit beam for transmission. In some embodiments, the BS can choose a beam for transmission based on beam quality reported by UE or according the reciprocity of uplink (UL) sounding reference signal (SRS) beam.

FIG. 3 includes an optional step 308 where a determination is made regarding the data or control information transmission strategy on the time unit where the IMR and data or control information can be frequency division multiplexed (FDM). The determination of data or control information transmission strategy can be according to the IMR receiving manner and quasi-co-location information. In some embodiments, the sending and receiving end can stipulate to use the same reception manner as the frequency division multiplexed data or control information such as PDCCH, PBCH, or PDSCH. The frequency division multiplexed data or control information can be another reference object for determining receiving manner of IMR.

In some embodiments, the base station can designate the receiving beam reference object of the IMR through configuration signaling.

In some embodiments, the data or control information transmission strategy on the time domain resource where the IMR is located can include no transmission of data or control information on the time domain resource where the IMR is located. Alternatively, in some other embodiments, the data or control information transmission strategy on the time domain resource where the IMR is located can include sending data or control information on the time domain resource where the IMR is located.

Figure 4:
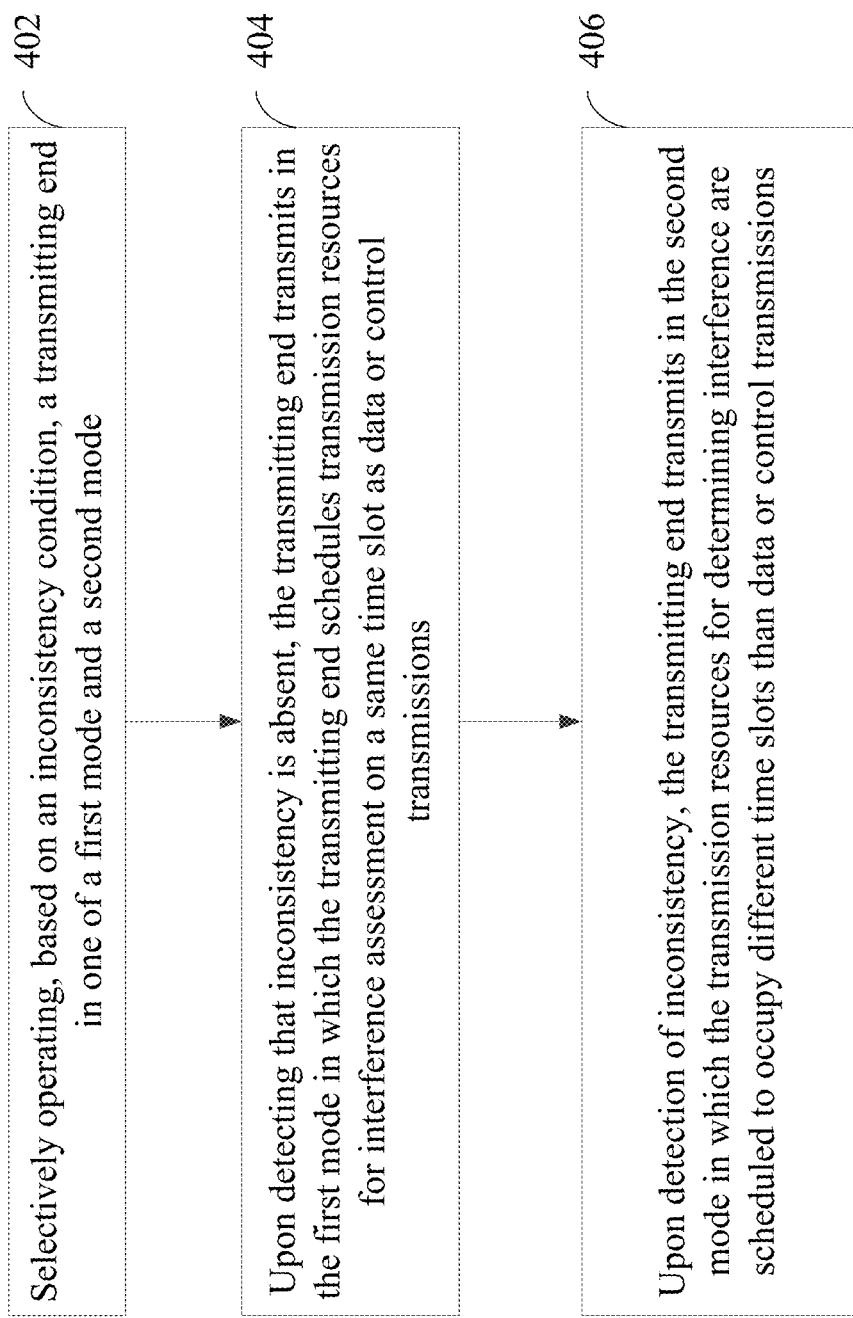
FIG. 4 shows another exemplary flowchart to determine transmission strategy of data or control information based on reception beam collision.

FIG. 4 shows another exemplary flowchart to determine transmission strategy of data or control information based on reception beam collision. At 402, a transmitting end can be selectively operated, based on an inconsistency condition, in one of a first mode and a second mode. At 404, the transmitting end, upon detecting that inconsistency is absent, transmits in the first mode in which the transmitting end schedules transmission resources for interference assessment on a same time unit as data or control transmissions. At 406, the transmitting end, upon detection of inconsistency, transmits in the second mode in which the transmission resources for determining interference are scheduled to occupy different time units than data or control transmissions.

A benefit of the exemplary flowcharts of FIGS. 3 and 4 is that it can help avoid reception beam collision.

Figure 5:
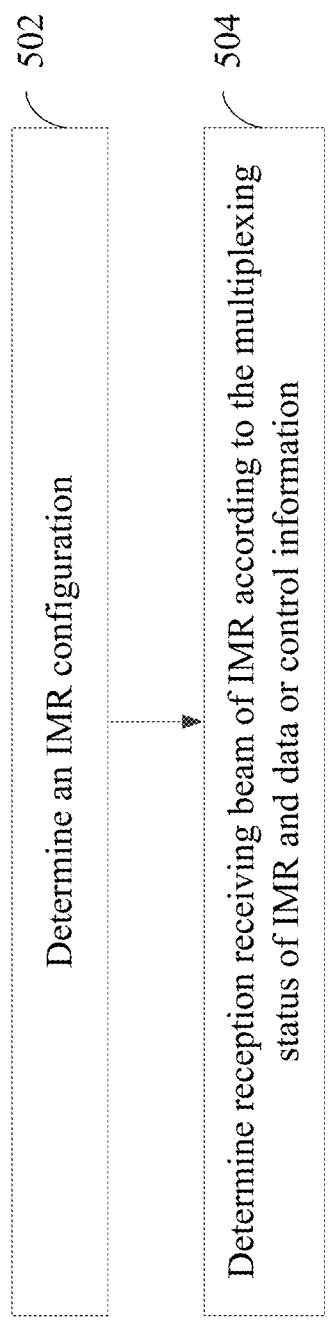
FIG. 5 shows an exemplary flowchart to determine the reception beam based on the multiplexing states of IMR.

FIG. 5 shows an exemplary flowchart to determine the reception beam based on the multiplexing states of IMR. At 202, an IMR configuration determination is made according to signaling of the sending end. For example, a base station can determine an IMR configuration based on the signaling sent by the user equipment.

At 204, a determination is made regarding the reception receiving beam of IMR according to the multiplexing status of IMR and data or control information such as PDSCH, PDCCH, PBCH, or reference signal (RS). In some embodiments, when the IMR and data or control information such as PDSCH, PDCCH, PBCH, or reference signal (RS) are not frequency-division multiplexed, the receiving method of IMR is determined according to the stipulation of the receiving end and the sending end or the configuration of the sending end. For example, when the IMR is not frequency-division multiplexed with data or control information, the receiving beam is determined based on a pre-configuration between a receiving end and a sending or transmitting end. In some other embodiments, when IMR is frequency-division multiplexed with data or control information, IMR reception is performed in the same manner as data or control information. For example, when IMR is frequency-division multiplexed with data or control information, a same beam is used for IMR and the data or control information.

In some embodiments, the reference signal (RS) can include total radiated sensitivity (TRS), CSI-RS, and synchronization signal (SS).

Figure 6:
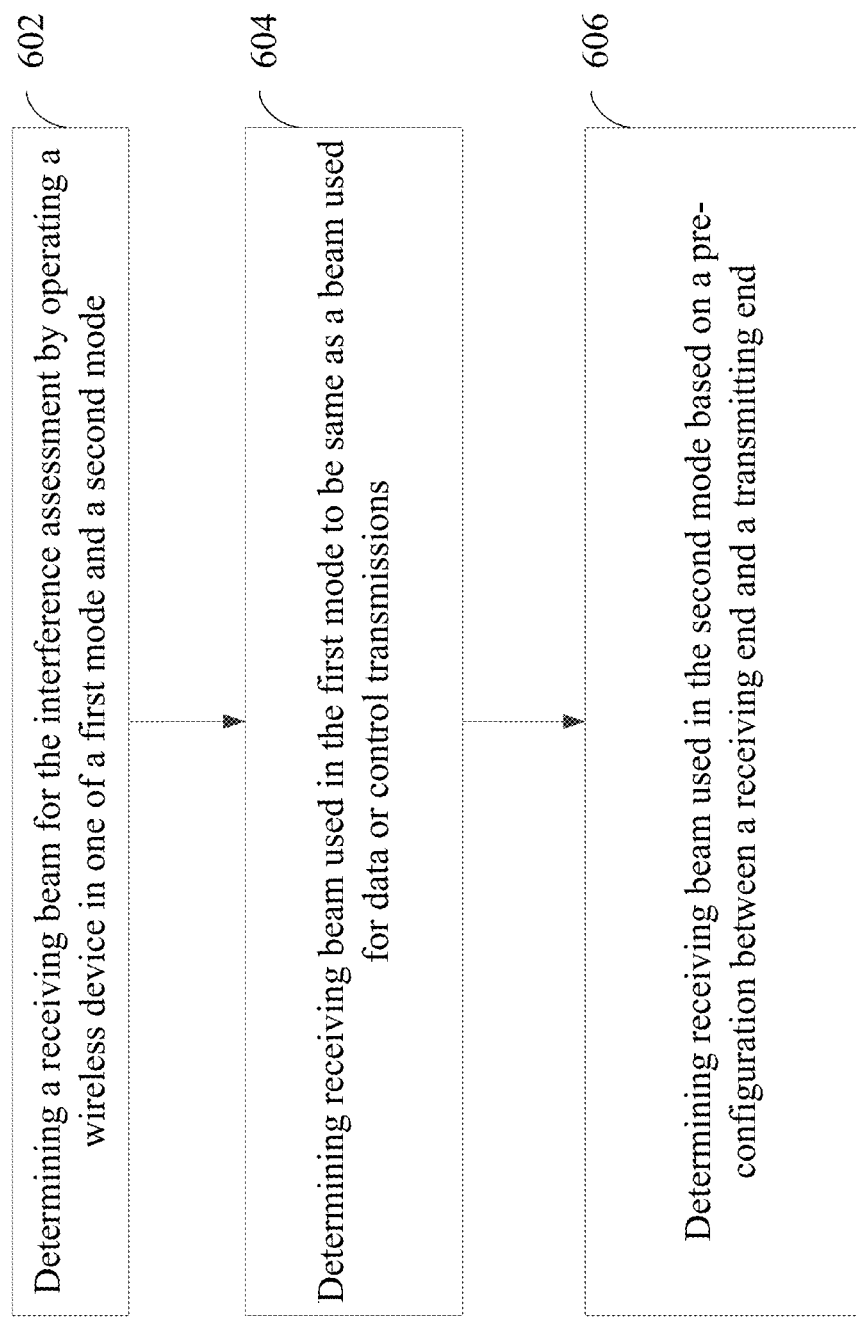
FIG. 6 shows another exemplary flowchart to determine the reception beam based on the multiplexing states of IMR.

FIG. 6 shows another exemplary flowchart to determine the reception beam based on the multiplexing states of IMR. At 602, the receiving beam is determined for the interference assessment by operating a wireless device in one of a first mode and a second mode. At 604, the receiving beam in the first mode is determined to be the same as a beam used for data or control transmissions. At 606, the receiving beam used in the second mode is determined based on a pre-configuration between a receiving end and a transmitting end.

The exemplary flowcharts of FIGS. 5 and 6 can determine reception beam based on the multiplexing states of IMR. A benefit of the exemplary flowchart of FIGS. 5 and 6 is that it can allow the base station to know the receiving manner of the terminal even when the reception beams collide.

Figure 7:
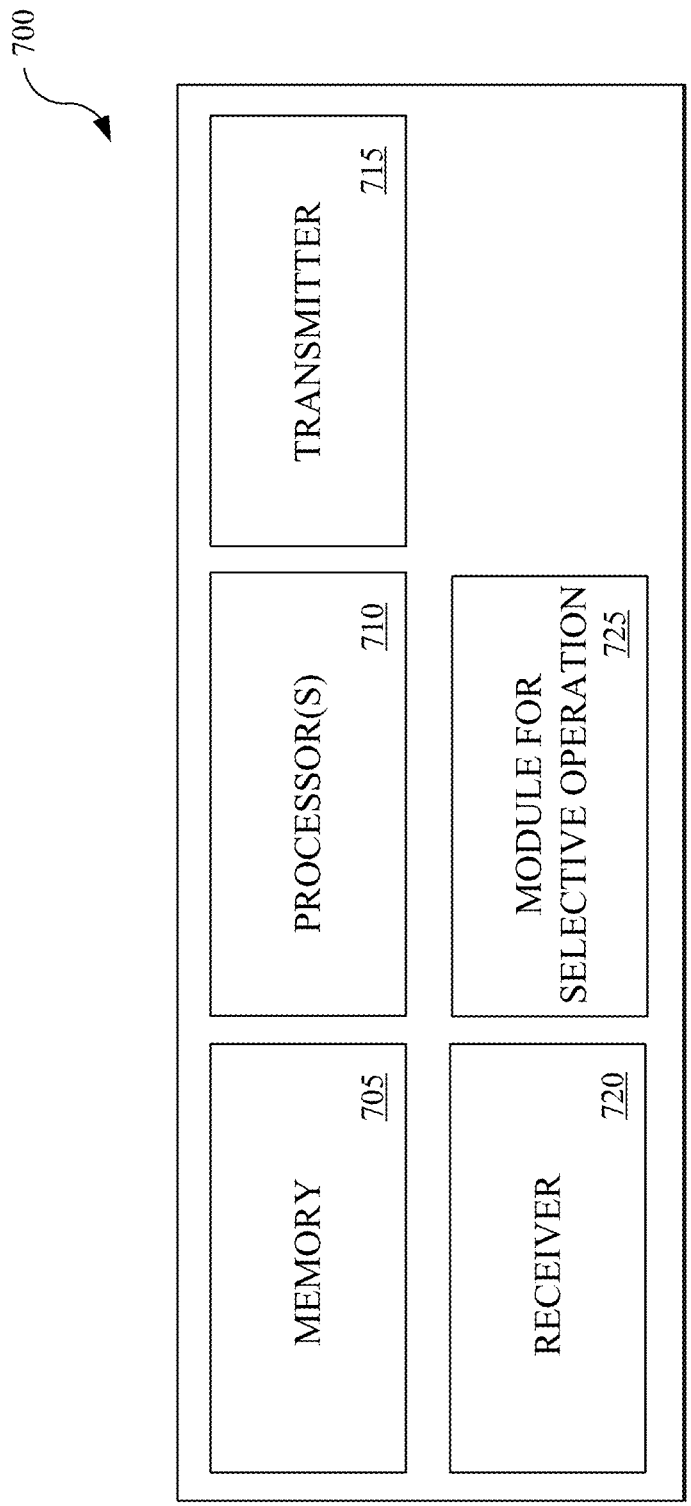
FIG. 7 shows a block diagram for an exemplary base station to determine transmission strategy of data or control information based on reception beam collision.

FIG. 7 shows a block diagram for an exemplary base station to determine transmission strategy of data or control information based on reception beam collision. The base station 700 includes at least one processor 710 and a memory 705 having instructions stored thereupon. The instructions upon execution by the processor 710 configure the base station 700 to perform several operations using the various modules. The transmitter 715 transmits various resources elements for IMR, control or data information. The receiver 720 receives the various control or data information transmitted by the mobile station.

The module for selective operation 725 can selectively operate, based on an inconsistency condition, a transmitting end in one of a first mode and a second mode. Upon detection of an absence of inconsistency, the module for selective operation 725 configures the transmitting end to transmit in the first mode in which the transmitting end schedules transmission resources for interference assessment on a same time unit as data or control transmissions. Upon detection of inconsistency, the module for selective operation 725 configures the transmitting end to transmit in the second mode in which the transmission resources for determining interference are scheduled to occupy different time units than data or control transmissions.

Figure 8:
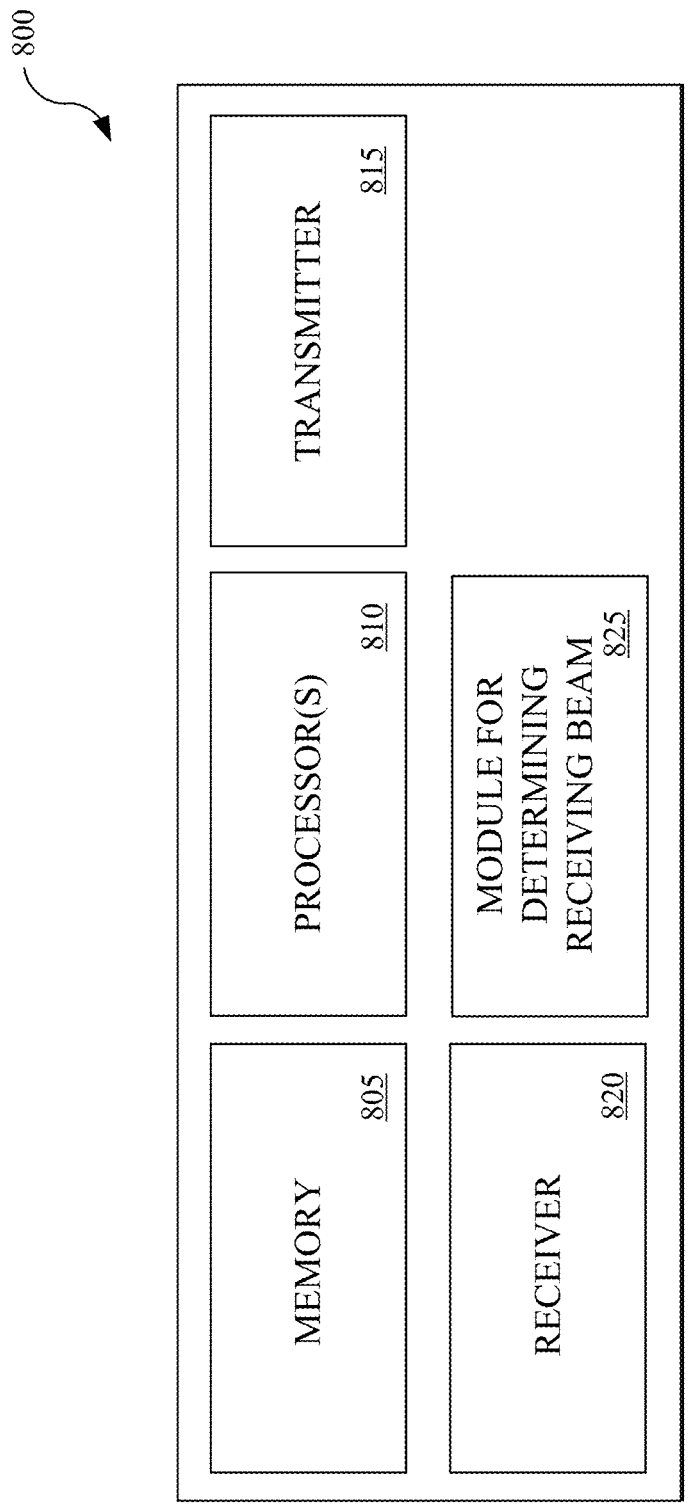
FIG. 8 shows another block diagram for an exemplary base station to determine the reception beam based on the multiplexing states of IMR.

FIG. 8 shows another block diagram for an exemplary wireless device to determine the reception beam based on the multiplexing states of IMR. The wireless device 800, such as a base station, includes at least one processor 810 and a memory 805 having instructions stored thereupon. The instructions upon execution by the processor 810 configure the wireless device 800 to perform several operations using the various modules. The transmitter 815 transmits various resources elements for IMR, control or data information. The receiver 820 receives the various control or data information transmitted by the mobile station.

The module for determining receiving beam 825 configures the wireless device 800 to determine a receiving beam for the interference assessment by operating a wireless device in one of a first mode and a second mode. The module for determining receiving beam 825 can determine that the receiving beam used in the first mode is the same as a beam used for data or control transmissions. The module for determining receiving beam 825 can also determine that the receiving beam used in the second mode is based on a pre-configuration between a receiving end and a transmitting end.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
  selectively operating, based on an inconsistency condition, a base station in one of a first mode or a second mode,
    wherein, upon detection of an absence of the inconsistency condition, the base station transmits in the first mode in which the base station transmits transmission resources for interference assessment on a same time unit as that used for data or control transmissions,
    wherein, upon detection of the inconsistency condition, the base station transmits in the second mode in which the transmission resources for interference assessment are transmitted on different time units than that used for data or control transmissions, wherein the inconsistency condition indicates that the base station cannot accurately determine a modulation and coding scheme (MCS) based on a channel quality indicator (CQI) received from a wireless device, and wherein the base station cannot accurately determine the MCS when the wireless device cannot have one receiving beam to perform interference measurement and another receiving beam to receive either data or control transmissions in a same time unit.

2. The wireless communication method of claim 1, wherein the transmission resources for interference assessment include interference measurement resource (IMR).

3. The wireless communication method of claim 1, wherein the data or control transmissions include transmissions of Physical Downlink Shared Channel (PDSCH), Physical Downlink Control Channel (PDCCH), or Demodulation Reference Signal (DMRS).

4. The wireless communication method of claim 1, wherein the transmission resources for interference assessment are determined by a method of transmission of Channel State Information-Reference Signal (CSI-RS) to the wireless device.

5. The wireless communication method of claim 1, wherein a configuration of the data or control transmissions indicates a transmit beam for transmission.

6. The wireless communication method of claim 1, wherein the transmission resources for the interference assessment and data or control transmissions are frequency division multiplexed in the first mode.

7. A wireless communication apparatus, comprising:
a processor configured to selectively operate, based on an inconsistency condition, a base station in one of a first mode or a second mode,
wherein, upon detection of an absence of the inconsistency condition, the base station is configured to transmit in the first mode in which the base station is configured to transmit transmission resources for interference assessment on a same time unit as that used for data or control transmissions,
wherein, upon detection of the inconsistency condition, the base station is configured to transmit in the second mode in which the transmission resources for interference assessment are configured for transmission on different time units than that used for data or control transmissions,
wherein the inconsistency condition indicates that the base station cannot accurately determine a modulation and coding scheme (MCS) based on a channel quality indicator (CQI) received from a wireless device, and
wherein the base station cannot accurately determine the MCS when the wireless device cannot have one receiving beam to perform interference measurement and another receiving beam to receive either data or control transmissions in a same time unit.

8. The wireless communication apparatus of claim 7, wherein the transmission resources for interference assessment are determined by a method of transmission of Channel State Information-Reference Signal (CSI-RS) to the wireless device.

9. The wireless communication apparatus of claim 7, wherein the transmission resources for the interference assessment and data or control transmissions are frequency division multiplexed in the first mode.

10. The wireless communication apparatus of claim 7, wherein the transmission resources for interference assessment include interference measurement resource (IMR).

11. The wireless communication apparatus of claim 7, wherein the data or control transmissions include transmissions of Physical Downlink Shared Channel (PDSCH), Physical Downlink Control Channel (PDCCH), or Demodulation Reference Signal (DMRS).

12. The wireless communication apparatus of claim 7, wherein a configuration of the data or control transmissions indicates a transmit beam for transmission.

13. A non-transitory computer readable program storage medium having code stored thereon, the code, when executed by a processor, causing the processor to implement a method, comprising:
selectively operating, based on an inconsistency condition, a base station in one of a first mode or a second mode,
wherein, upon detection of an absence of the inconsistency condition, the base station transmits in the first mode in which the base station transmits transmission resources for interference assessment on a same time unit as that used for data or control transmissions,
wherein, upon detection of the inconsistency condition, the base station transmits in the second mode in which the transmission resources for interference assessment are transmitted on different time units than that used for data or control transmissions,
wherein the inconsistency condition indicates that the base station cannot accurately determine a modulation and coding scheme (MCS) based on a channel quality indicator (CQI) received from a wireless device, and
wherein the base station cannot accurately determine the MCS when the wireless device cannot have one receiving beam to perform interference measurement and another receiving beam to receive either data or control transmissions in a same time unit.

14. The non-transitory computer readable program storage medium of claim 13, wherein the transmission resources for interference assessment include interference measurement resource (IMR).

15. The non-transitory computer readable program storage medium of claim 13, wherein the data or control transmissions include transmissions of Physical Downlink Shared Channel (PDSCH), Physical Downlink Control Channel (PDCCH), or Demodulation Reference Signal (DMRS).

16. The non-transitory computer readable program storage medium of claim 13, wherein the transmission resources for interference assessment are determined by a method of transmission of Channel State Information-Reference Signal (CSI-RS) to the wireless device.

17. The non-transitory computer readable program storage medium of claim 13, wherein a configuration of the data or control transmissions indicates a transmit beam for transmission.

18. The non-transitory computer readable program storage medium of claim 13, wherein the transmission resources for the interference assessment and data or control transmissions are frequency division multiplexed in the first mode.

* * * * *